W. E. SAXE.
PANORAMIC APPARATUS.
APPLICATION FILED OCT. 21, 1916.

1,357,656.

Patented Nov. 2, 1920.
2 SHEETS—SHEET 1.

Witness
E. R. Poland

Inventor.
Walter E. Saxe.
Cassell Severance,
Attorney.

W. E. SAXE.
PANORAMIC APPARATUS.
APPLICATION FILED OCT. 21, 1916.
1,357,656.
Patented Nov. 2, 1920.
2 SHEETS—SHEET 2.
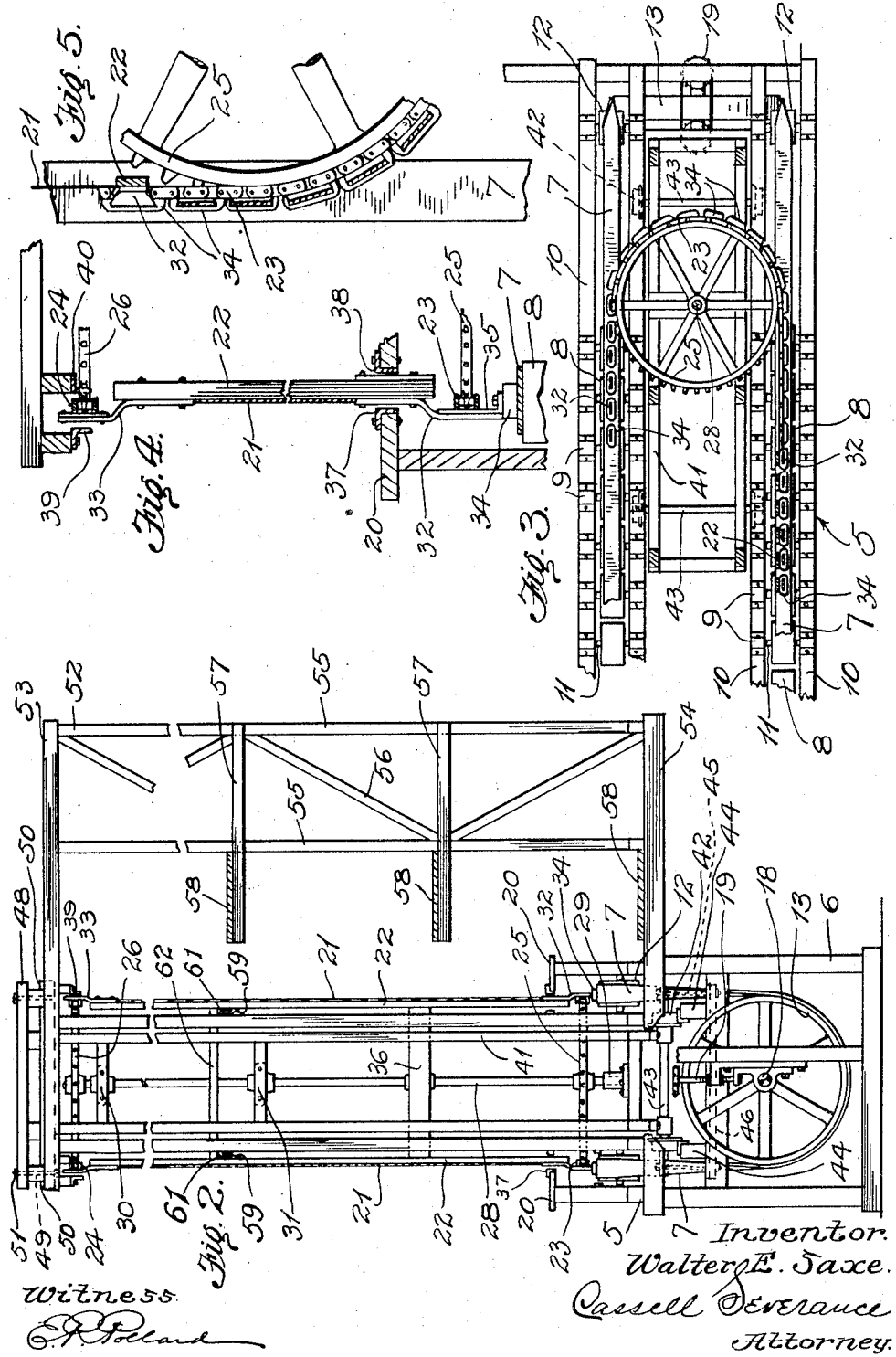
Witness
C. R. Pollard
Inventor.
Walter E. Saxe.
Cassell Severance
Attorney.

UNITED STATES PATENT OFFICE.

WALTER E. SAXE, OF INGLEWOOD, CALIFORNIA.

PANORAMIC APPARATUS.

1,357,656.  Specification of Letters Patent.  Patented Nov. 2, 1920.

Application filed October 21, 1916. Serial No. 126,900.

*To all whom it may concern:*

Be it known that I, WALTER E. SAXE, a citizen of the United States, residing at Inglewood, in the county of Los Angeles and State of California, have invented certain new and useful Improvements in Panoramic Apparatus, of which the following is a specification.

This invention relates to improvements in cycloramic and panoramic mechanisms, in which a traveling back ground, pictorial scene, or curtain device is employed, means being arranged for moving the scene at any desired speed, for changing the scenic back ground for a pictorial representation of any kind. The mechanism is particularly adapted and designed for the production of a traveling back ground or scenic curtain, especially useful in connection with certain moving picture productions, and is also especially useful in connection with a traveling floor, or support of any kind, whereby the moving elements of the picture to be produced, as for instance, persons, animals, vehicles, can be made to appear to move, while the camera or moving picture machine is stationary. With the moving features of the picture operating on a traveling floor, and with a traveling back ground behind them, the same result can be obtained before a stationary camera, as if the camera were moved at the same rate of speed as the moving features of the picture would have to move, if the traveling floor and traveling back ground, or scenic curtain were not employed. Of course, a better picture results where the camera does not have to be moved and jarred.

It is an object of the invention to provide a traveling scenic curtain, and a traveling support therefor.

It is a further object of the invention to provide an endless panoramic curtain for representing a moving back ground, and to provide the same with a traveling edge support.

It is still a further object of the invention to provide a traveling cycloramic curtain, and a driving means for movably supporting the same.

It is still a further object of the invention to provide a traveling back ground or scenery curtain, adapted to be carried by stretching and curtain holding members, guiding means being provided for said members, a traveling belt being also provided for the members to rest upon, whereby they are supported and also driven for moving the said curtain.

With these and other objects in view, the invention comprises certain novel constructions, combinations, and arrangements of parts as will be hereinafter more fully described and claimed.

In the accompanying drawings:

Fig. 2 is an end elevation of the said mechanism.

Fig. 3 is a horizontal sectional view through one end of the mechanism, the section being taken above the lower sprocket wheel which carries the lower sprocket chain of the device.

Fig. 4 is a detail vertical sectional view through a portion of the panoramic curtain device, showing one of the curtain holding members or bars, and means for moving and guiding the same, intermediate portions of said bar being broken away.

Fig. 5 is a fragmentary detail view of a portion of one of the lower sprocket wheels showing the engagement thereof, with the sprocket chain, which is connected with the curtain carrying slats or bars.

Figure 1:
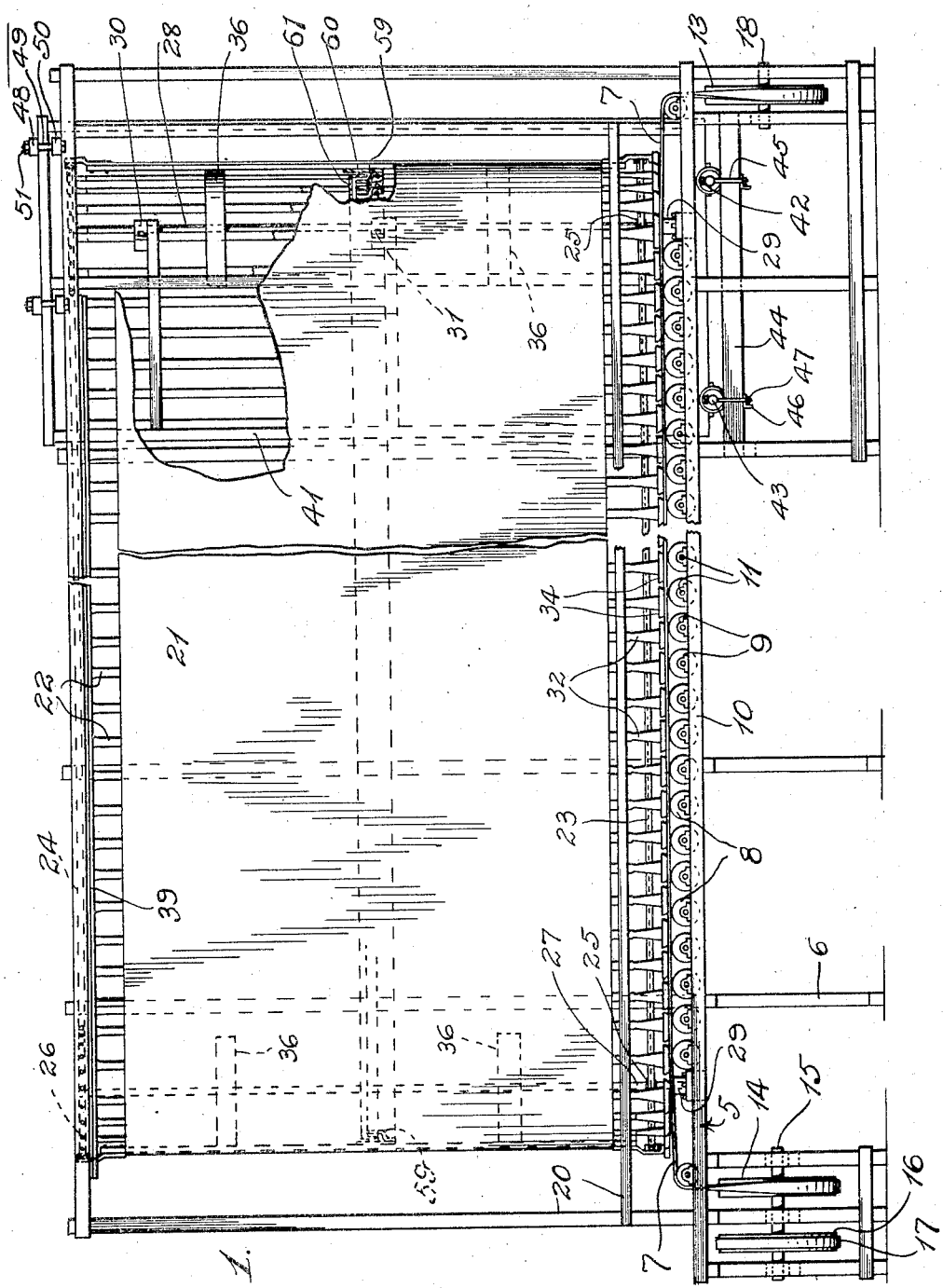
Figure 1 is a side elevation of a cycloramic curtain constructed in accordance with this invention, a portion thereof being broken away to reveal some of the interior structure.

The device of the present invention is designed for the production of movable scenic effects, and is particularly useful in connection with the taking of moving pictures of moving objects, when it is desired to have the camera or moving picture machine stationary, while the moving or traveling objects are given the appearance of moving at a greater or less speed, as by means of a traveling floor or other moving supporting surface, the scenery or back ground being also caused to move simultaneously at any desired rate of speed to carry out the proper effect. The drawing illustrates one practical means of carrying into effect the invention, and the features of the invention will now be more particularly described, reference being had to the illustration.

In the drawings, 5 indicates a base frame mounted on standards or supports 6 at any desired height. Movably mounted on the said frame is a traveling belt 7, preferably endless, and moving over a series of supporting rollers 8 carried by the horizontal portion of the said base frame 5. The said rollers are mounted upon any suitable bearings 9, carried by pairs of longitudinally arranged beams 10 of the said main frame 5. Each of the said rollers 8 may be provided with short shafts 11, the ends of which project sufficiently beyond the rollers on each side to afford suitable journals for engaging the said journal bearings 9. The rollers 8 are arranged sufficiently close together to cause the belt to extend horizontally from roller to roller. The belt 7 is guided near the ends of the frame by rollers 12, from which the belt passes around vertical transversely arranged pulleys or drums 13 and 14, there being one on each end of the frame, the belt making a quarter turn in passing from each of the rollers 12 to the said pulley or drums 13. By this arrangement, an endless belt may be employed, a front lap traveling in one direction while the rear lap travels in the opposite direction.

The belt thus arranged and given a continuous movement in any suitable manner, affords a continuous traveling support and frictional driving means for the cycloramic or panoramic curtain, and the structure upon which the same is stretched, the curtain thus receiving its movement only from the frictional engagement of its stretching and holding members, the curtain structure being arranged to have an edgewise engagement with the two laps of the belt. The belt is preferably driven by power in any desired manner. The pulley 14 is mounted upon a shaft 15 to which is fixed another pulley 16. The said pulley 16 is connected by suitable belting 17 directly or indirectly with any suitable electric or other motor, or proper source of power, not shown.

In order to keep the driving belt 7 taut at all times, the pulley 13 is mounted in adjustable bearings at 18. Adjusting abutment screws 19 are adapted to force the said journals downwardly for taking up any slack in the belt, and holding the pulley 13 in proper position to maintain the necessary tautness of the belt.

Rising from the base frame 5 is a suitable frame 20, which is carried to any suitable height to accommodate the traveling curtain or scenic back ground. The curtain mechanism is mounted within this frame, in which its movement is guided, the curtain structure, however, resting and traveling except at the ends upon the belt 7. The curtain 21 may be made of any desired material, as for instance, a canvas or duck of any suitable quality, which is adapted for having scenery painted thereon. The said curtain is stretched upon and carried by a series of upright or vertical bars 22, made long enough to extend a short distance above and below the edges of the curtain 21. The curtain is tacked or otherwise secured to the bar 22, a fastening of this or other suitable kind being sufficient if applied at the upper and lower edges of the curtain. The bars are secured to endless sprocket chains 23 and 24, near the top and bottom of the curtain respectively. The said sprocket chains may be of any usual or ordinary type, and engage the peripheries of sprocket wheels 25 and 26, secured to the lower and upper ends of vertical shafts 27 and 28, which are mounted vertically on the main frame 5 and in the upper frame 20 of the apparatus. The said shafts 27 and 28 rest on end or step bearings 29 and their upper and intermediate portions engage suitable bearings at 30 and 31, which are braced and held by any suitable intermediate structure mounted within the frame of the apparatus and within the path of the curtain. The bars 22 are provided with offset attaching members 32 and 33, which project from the lower and upper ends thereof, with sufficient distance beyond the ends of the bars to have the sprocket chains 23 and 24 positively secured thereto. The offset arrangement of the pieces or members 32 and 33 make it possible to have the pitch of the sprocket wheels 25 and 26, approximately coincide with the curvature of the curtain at the ends of its laps. The pitch of the said sprocket chains, however, is made slightly greater than the radius of the semicylindric curves made by the curtain at each end of the structure, so that any strain which might come upon the curtain in turning at the ends of the structure will be avoided. The lower ends of the bars 22 are fastened to supporting shoes 34, preferably by means of angle plates 35, which are bolted to the shoes 34, and have their upright portions lapped upon and securely fastened to the lower ends of the offset piece or member 32, as will be clearly understood by reference to Fig. 4, of the drawing. The shoes 34 may be of any desired material, but are preferably made of approximately oblong rectangular blocks of wood, the ends of which may be slightly rounded at their lower corners as shown in the Fig. 1, of the drawing. The said blocks are made of sufficient length to come reasonably close together at their ends, without danger of their interfering with each other.

The said blocks are made nearly as long as the distance between the points where the belt 7 touches and rests upon the peripheries of adjacent rollers 8, so there is no tendency for sagging of the belt under the weight of the curtain above, and of the bars which carry the same. The shoes rest upon the driving belt 7 and form a sufficient frictional contact with the surface of the said belt under the weight of the curtain structure to drive the curtain in a sufficiently positive manner. Since the front and back laps of the belt 7 travel in opposite directions, and the shoes 34 must pass from one to the other at the ends of the apparatus, the rollers 12 over which the ends of the belt travel are depressed sufficiently below the adjacent rollers 8, to disengage the belt from the shoes 34 at points substantially opposite the shafts 27 and 28. The bars 22 will be supported at the ends of the apparatus in passing from one belt to the other by the sprocket chains 23 and 24, as they pass around the sprocket wheels 25 and 26. Any friction between the bar supporting shoes 34 in passing from one lap of belt 7 to the other, is thus entirely obviated. At all points between the two shafts 27 and 28, however, the intermediate weight of the curtain structure rests upon and is carried by the traveling belt, and the engagement between said belt and curtain structure is found ample in practice, to make it possible to drive the curtain at any desired speed. The bars 22 in addition to passing around the sprocket wheels 25 and 26 at the ends of the apparatus, are further braced and guided at intermediate points by engaging the peripheries of intermediate pulleys 36 mounted upon and carried by the said shafts 27 and 28 at any suitable points thereon. The straight portions of the laps of the said curtain structure, are guided by longitudinally arranged guide members 37 and 38 mounted upon the main frame 5, and receiving the lower ends of the bars 22 between them. Similar guide members 39 and 40 engage the members 33 and sprocket chain at the top of the apparatus frame, as shown in detail in Fig. 4.

The frame carrying the traveling curtain is also provided with means for taking up any slack therein, and for keeping the same sufficiently taut to present a smooth surface for the back ground or scenery. One end of the upper frame has mounted therein a movable frame 41, which is mounted upon wheels 42 carried by transverse shafts 43. The wheels are preferably of the flanged type, and rest on longitudinal bars or beams 44 mounted in the frame 5, below the beams which support the rollers 8. The shaft 28 is mounted upon the movable frame 41, so that by moving the said frame 41 toward the adjacent end of the main frame, the curtain structure may be kept taut as will be readily understood. The journal bearings for the shaft 28 are therefore all carried by the said movable frame 41, so that the entire end of the curtain structure at this end of the framing can be moved to adjust the tautness thereof.

In order to clamp the frame 41 in its adjusted positions, depending bolts 45 are carried by the outer ends of said shafts 43, and engage angle bars 46 which extend below the beams 44. By loosening nuts 47 on the ends of said bolts 45, the movable frame may be permitted to be adjusted for taking up the slack of the curtain, after which a tightening of the nuts 47 will cause the angle bars 46 to grip the beams 44, between them and the wheels 42. At the top of the frame 41 cross bars 48 extend over the top thereof, the ends of said bars being connected by bolts 49 with the ends of the cross bars 50 upon the top of the frame 20. Nuts 51 on the upper ends of said bolts 49 afford means for clamping the upper end of the movable frame 41 in its adjusted positions, the same as in the case of the lower clamping means carried by the shaft 43. It will be observed that the traveling belt 7 extends sufficiently beyond the end of curtain structure to afford ample room for the adjustment of the movable frame 41, without interfering with the support and driving of the said curtain.

In order to guard against a possible springing out of position of the bars 22 at intermediate points, the said bars 22 are provided with inwardly projecting hook pieces 59, which project under and inside of the depending flange 60, of an inner guide member 61. The said guide member 61 is mounted upon an intermediate frame portion 62, located within the curtain structure as clearly shown in Figs. 1 and 2 of the drawing. The said hook pieces 59 are merely loosely extended beneath said guide, so that there is substantially no friction between the parts and yet any tendency of strain upon the central portions of the curtain carrying bars, is prevented from drawing the parts out of place.

It is also preferable to construct the frame with an auxiliary framing 52 upon the back of the apparatus, the said framing consisting of upper and lower connecting beams 53 and 54, extended from the main frame 5, and having vertical members 55 with suitable braces 56 together with horizontal bearer bars 57, providing a firm and rigid structure. This frame not only greatly increases the rigidity of the upper frame 20, but offers an excellent means for supporting boards or platforms 58, upon which workmen may stand, who are painting and providing the desired back ground scenery upon the curtain of the device. The workmen may thus have access to substantially the entire inner lap of the curtain, so that a number can work upon the same at a time, and the scenery can be changed very rapidly. The curtain is moved from time to time until the scenery is completed entirely around the same.

It will be evident that many of the minor details of construction may be modified and that mechanical equivalents thereof may be instituted for various parts of the apparatus, without departing in the least from the spirit of the invention.

What is claimed is:

1. A cycloramic apparatus comprising a traveling endless scenic curtain, an independent traveling belt for supporting and moving the same, and a series of anti-friction members movably supporting the said belt.

2. A cycloramic apparatus comprising a traveling curtain, curtain carrying members supporting the curtain, an endless belt upon which the curtain carrying members rest, and rollers supporting the said traveling belt, whereby the traveling belt becomes the driving means for the curtain carrying members and the curtain.

3. A cycloramic apparatus for furnishing a traveling scenic back ground, comprising an upright traveling curtain, vertical bars carrying the same, shoes upon the said bars, a traveling belt for supporting and driving the said shoes, and anti-friction means for movably supporting the said belt.

4. A panoramic apparatus comprising a movable endless curtain adapted to travel on its edge, bars carrying the same, flexible connecting members joining said bars, guiding and holding means at the ends of the curtain for directing and supporting the said flexible members, friction shoes carried by the lower ends of said bars, and a traveling conveyer means, beneath the intermediate portions of the traveling curtain.

5. A panoramic apparatus comprising a traveling endless curtain having upright bars secured thereto, vertical shafts at the ends of the curtain laps about which the said curtain turns, guides for the said bars between the said shafts, sprocket wheels carried by said shafts, sprocket chains connecting the said bars and guiding them around the said sprocket wheels, a traveling belt having laps driven in opposite directions beneath the laps of the curtain, the said belt being adapted to support the curtain bars between the said sprocket wheels, means for depressing the belt beneath the bars at points below the said bars where they engage the said sprocket wheels, whereby the curtain bars may pass from one portion of the belt to the other without friction, and means for driving the said belt.

6. A panoramic scenic curtain mechanism comprising an endless curtain, an endless traveling belt arranged below the edges of the curtain, end pulleys for engaging the said belt, guiding end pulleys for permitting the belt to pass with a proper turn around the said end pulleys, intermediate friction rollers adapted to support the intermediate portions of said belt in contact with the intermediate portions of the traveling curtain structure, and means for driving one of the end pulleys of said belt for actuating the same, and a sprocket mechanism for supporting the traveling curtain at the end curved portions thereof, where the endless curtain makes its bends for returned movements.

7. An apparatus of the class described comprising an endless scenic curtain, a frame for holding the same in proper position, shafts in said frame at the turns of said curtain, spreading pulleys therefor, an adjustable framing carrying one of said shafts and the pulley devices thereon, whereby slackness in the curtain may be taken up, means for clamping said adjustable frame upon the main frame for keeping the curtain taut, and curtain driving and supporting means engaging the edges of the curtain for moving it in said framing.

In testimony whereof I have hereunto set my hand in presence of two witnesses.

WALTER E. SAXE.

Witnesses:
CASSELL SEVERANCE,
HAZEL BRUNDAGE.